United States Patent
Li et al.

(10) Patent No.: US 10,171,883 B2
(45) Date of Patent: Jan. 1, 2019

(54) DIRECTIONAL MOCA FILTER

(71) Applicant: PPC Broadband, Inc., East Syracuse, NY (US)

(72) Inventors: Yan Li, Syracuse, NY (US); Erdogan Alkan, Fayetteville, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 15/196,095

(22) Filed: Jun. 29, 2016

(65) Prior Publication Data

US 2017/0013320 A1    Jan. 12, 2017

Related U.S. Application Data

(60) Provisional application No. 62/188,916, filed on Jul. 6, 2015.

(51) Int. Cl.
| | |
|---|---|
| *H04N 7/173* | (2011.01) |
| *H04N 21/61* | (2011.01) |
| *H04N 7/10* | (2006.01) |

(52) U.S. Cl.
CPC ......... *H04N 21/6168* (2013.01); *H04N 7/108* (2013.01); *H04N 21/6118* (2013.01)

(58) Field of Classification Search
None
See application file for complete search history.

(56) References Cited

U.S. PATENT DOCUMENTS

| | | | |
|---|---|---|---|
| 7,749,026 B1 | 7/2010 | Li et al. | |
| 8,734,025 B2 | 5/2014 | Snyder et al. | |
| 8,758,059 B2 | 6/2014 | Watanabe et al. | |
| 8,975,520 B2 | 3/2015 | Blake et al. | |
| 9,028,276 B2 | 5/2015 | Wilson et al. | |
| 9,112,323 B2 | 8/2015 | Goebel et al. | |
| 9,178,317 B2 | 11/2015 | Holland | |
| 9,246,275 B2 | 1/2016 | Holland et al. | |
| 9,444,197 B2 | 9/2016 | Goebel et al. | |
| 9,647,394 B2 | 5/2017 | Goebel et al. | |
| 2008/0080404 A1 | 4/2008 | Kodim | |
| 2008/0100487 A1 | 5/2008 | Tsai et al. | |
| 2008/0216144 A1* | 9/2008 | Weinstein | H04H 20/69 725/127 |
| 2008/0235750 A1* | 9/2008 | Urbanek | H04L 12/2801 725/127 |
| 2010/0100918 A1 | 4/2010 | Egan, Jr. et al. | |
| 2010/0125877 A1* | 5/2010 | Wells | H04L 12/2801 725/78 |
| 2011/0010749 A1 | 1/2011 | Alkan | |

(Continued)

OTHER PUBLICATIONS

Hane Thomas (Authorized Officer), International Search Report and Written Opinion dated Sep. 26, 2016, PCT Application No. PCT/US2016/039938, pp. 1-9.

*Primary Examiner* — William J Kim
(74) *Attorney, Agent, or Firm* — MH2 Technology Law Group LLP

(57) ABSTRACT

The present disclosure is directed a directional Multimedia over Coax Alliance (MoCA) filter. The MoCA filter can include a first port and a second port. Additionally, the MoCA filter can include a bidirectional path and a unidirectional path in parallel between the first port and the second port. Further, the unidirectional path can include an active isolator or a passive isolator.

26 Claims, 4 Drawing Sheets

(56) References Cited

U.S. PATENT DOCUMENTS

2011/0187481 A1\* 8/2011 Alkan ................. H03H 7/0138
                                                      333/175
2012/0331501 A1   12/2012 Shafer
2015/0020134 A1   1/2015  Bowler et al.

\* cited by examiner

DIRECTIONAL MOCA FILTER

CROSS-REFERENCE TO RELATED APPLICATIONS

This application is claims the benefit and priority of, U.S. Provisional Patent Application Ser. No. 62/188,916, filed Jul. 6, 2015. The entire contents of which are hereby incorporated by reference.

FIELD

This invention generally relates to community access television or cable television (CATV) networks and to MoCA in-home entertainment networks. More particularly, the present invention relates to a MoCA filter.

BACKGROUND

CATV networks use an infrastructure of interconnected coaxial cables, signal splitters and combiners, repeating amplifiers, filters, trunk lines, cable taps, drop lines and other signal-conducting devices to supply and distribute high frequency "downstream" signals from a main signal distribution facility, known as a "headend," to the premises (e.g., homes and offices) of CATV subscribers. The downstream signals operate the subscriber equipment, such as television sets, telephone sets, and computers. In addition, most CATV networks also transmit "upstream" signals from the subscriber equipment back to the headend of the CATV network. For example, the subscriber uses a set top box to select programs for display on the television set. As another example, two-way communication is essential when using a personal computer connected through the CATV infrastructure to the public Internet. As a further example, voice over Internet protocol (VOIP) telephone sets use the CATV infrastructure and the public Internet as part of the communication medium for two-way telephone conversations.

To permit simultaneous communication of upstream and downstream CATV signals, and to permit interoperability of the subscriber equipment and the equipment associated with the CATV network infrastructure outside of subscriber premises, the downstream and upstream signals are confined to two different frequency bands. For example, in some CATV networks the downstream frequency band can be within the range of 54-1002 megahertz (MHz) and the upstream frequency band can be within the range of 5-42 MHz.

The downstream signals are delivered from the CATV network infrastructure to the subscriber premises at a CATV entry adapter, which is also commonly referred to as an entry device, terminal adapter, or a drop amplifier. The entry adapter is a multi-port device which connects at an entry port to a CATV drop cable from the CATV network infrastructure and which connects at a multiplicity of other distribution ports to coaxial cables which extend throughout the subscriber premises to cable outlets. Each cable outlet is available to be connected to subscriber equipment. Typically, most homes have coaxial cables extending to cable outlets in almost every room, because different types of subscriber equipment may be used in different rooms. For example, television sets, computers, and telephone sets are commonly used in many different rooms of a home or office. The multiple distribution ports of the entry adapter deliver the downstream signals to each cable outlet and conduct the upstream signals from the subscriber equipment through the entry adapter to the drop cable of the CATV infrastructure.

In addition to television sets, computers and telephones, a relatively large number of other entertainment and multimedia devices are available for use in homes. For example, a digital video recorder (DVR) is used to record broadcast programming, still photography and moving pictures in a memory medium so that the content can be replayed on a display or television set at a later time selected by the user. As another example, computer games are also played at displays or on television sets. Such computer games may be those obtained over the Internet from the CATV network or from media played on play-back devices connected to displays or television sets. As a further example, signals from a receiver of satellite-broadcast signals may be distributed for viewing or listening throughout the home. These types of devices, including the more-conventional television sets, telephone sets, and devices connected to the Internet by the CATV network are generically referred to as multimedia devices.

The desire to use multimedia devices at multiple different locations within the home or subscriber premises has led to the creation of the Multimedia over Coax Alliance (MoCA). MoCA has developed specifications for products to create an in-home entertainment network for interconnecting presently-known and future multimedia devices. A MoCA in-home network uses the subscriber premise or in-home coaxial cable infrastructure originally established for distribution of CATV signals within the subscriber premises, principally because that coaxial cable infrastructure already exists in most homes and is capable of carrying much more information than is carried in the CATV frequency bands. A MoCA network is established by connecting MoCA-enabled or MoCA interface devices at the cable outlets in the rooms of the subscriber premises. These MoCA interface devices implement a MoCA communication protocol which encapsulates the signals normally used by the multimedia devices within MoCA signal packets and then communicates the MoCA signal packets between other MoCA interface devices connected at other cable outlets. The receiving MoCA interface device removes the encapsulated multimedia signals from the MoCA signal packets, and delivers the multimedia signals to the connected display, computer, or other multimedia device from which the content is presented to the user.

Each MoCA-enabled device is capable of communicating with every other MoCA-enabled device in the in-home or subscriber premises MoCA network to deliver the multimedia content throughout the home or subscriber premises. The multimedia content that is available from one multimedia device can be displayed, played, or otherwise used on a different MoCA enabled device at a different location within the home, thereby avoiding physically relocating the originating multimedia device from one location to another within the subscriber premises. The communication of multimedia content over the MoCA network is considered beneficial in more fully utilizing the multimedia devices present in modern homes.

A MoCA network can potentially leak signal out of the subscriber premises via the CATV entry adapter. The leaked signal can be received by a neighboring home also using MoCA, which can cause interference, privacy, and security issues. To avoid such leakage, a MoCA filter can be installed at the CATV entry adapter.

SUMMARY

Embodiments in accordance with the present disclosure provide a MoCA filter including a first port and a second port. Additionally the MoCA filter includes a bidirectional path and a unidirectional path in parallel between the first port and the second port.

Additionally, embodiments in accordance with the present disclosure provide a MoCA filter including a first port and a second port. The MoCA filter also includes a bidirectional path communicating an upstream signal and a downstream signal between the second port and the first port. The MoCA filter further includes a unidirectional path solely communicating the downstream signal from the first port to the second port. The bidirectional path includes a first low-pass filter device serially connected to a second low-pass filter device. The unidirectional path includes a first band-pass filter device serially connected to an active isolator device and a second low-pass filter device.

Further, embodiments in accordance with the present disclosure provide a MoCA filter including a first port and a second port. The MoCA filter also includes a bidirectional path communicating an upstream signal and an expanded downstream signal between the second port and the first port. The MoCA filter further includes a unidirectional path solely communicating the expanded downstream signal from the first port to the second port. The bidirectional path includes a first low-pass filter device serially connected to a second low-pass filter device. The unidirectional path includes a first band-pass filter device serially connected to a passive isolator device and a second band-pass filter device. The passive isolator device is a circulator. A first node of the circulator receives the expanded downstream signal. A second node of the circulator isolates a MoCA signal from the first port. A third node of the circulator is terminated.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

DETAILED DESCRIPTION

This invention generally relates to community access television or cable television (CATV) networks and to MoCA in-home entertainment networks. More particularly, the present invention relates to a MoCA filter. To prevent MoCA network signals leaking outside of a premises, embodiments of the MoCA filter disclosed herein pass a downstream signal having a frequency range between, for example, about 5 MHz to about 1218 MHz provided from a CATV network infrastructure to the premises via a CATV entry adapter to customer side. Additionally, embodiments of the MoCA filter block a MoCA signal having a frequency range from, for example, about 1125 MHz to about 1675 MHz output from the premises via the CATV entry adapter. Thus, the MoCA filter in accordance with the present disclosure can support an expanded CATV band of about 5 MHz to about 1218 MHz by preventing leakage of MoCA signals above 1125 MHz. Accordingly, a MoCA filter in accordance with the present disclosure can protect customer's privacy in the expanded CATV band by preventing information from a MoCA network from leaving a premises, while permitting two-way communication for CATV and Internet services.

Figure 1:
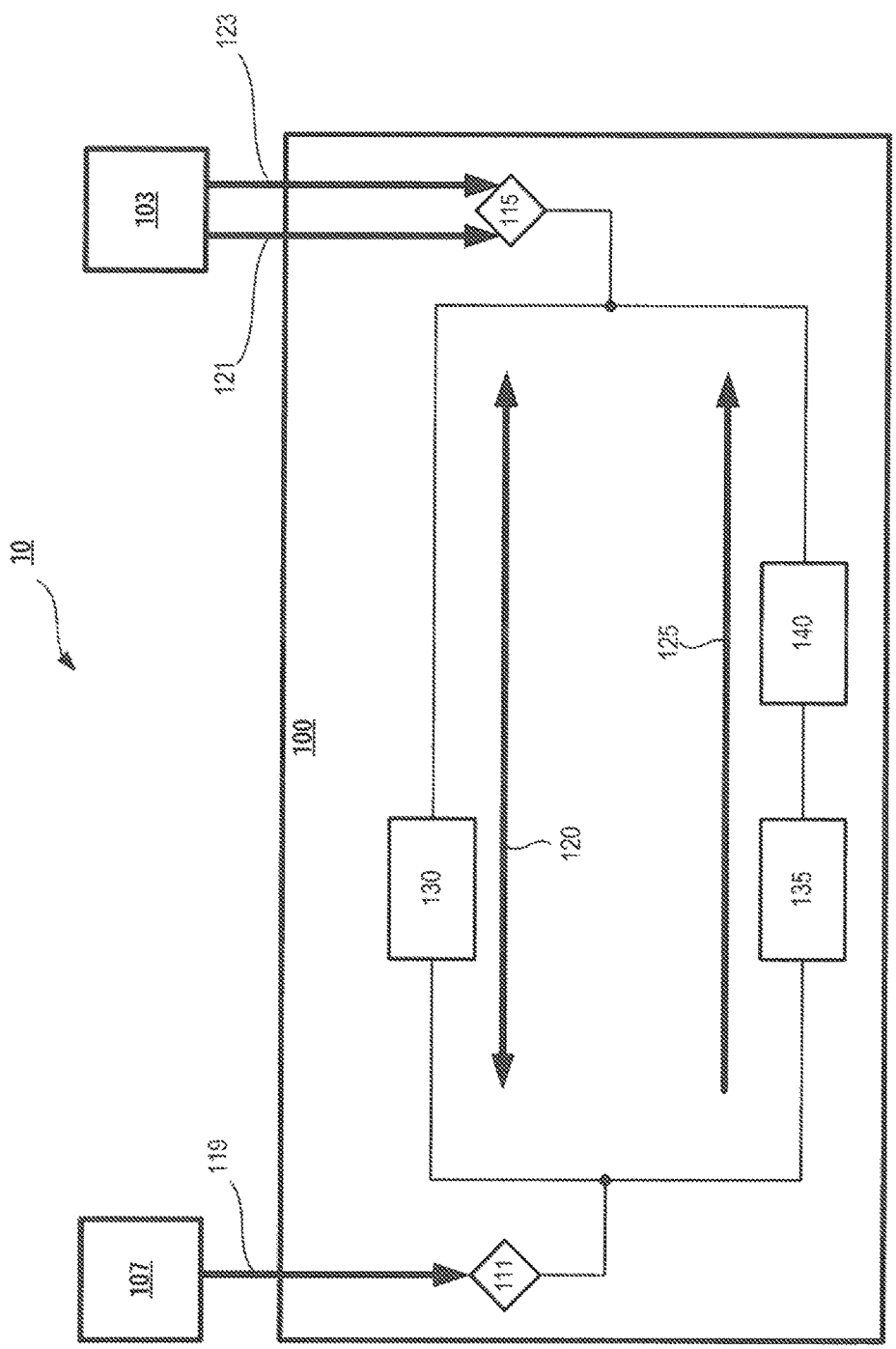
FIG. 1 shows a block diagram illustrating an example of an environment for a MoCA filter in accordance with aspects of the present disclosure.

FIG. 1 shows a block diagram illustrating an example environment 10 in accordance with aspects of the present disclosure. The environment 10 includes a directional MoCA filter 100, a premises 103, and a headend 107. In embodiments, the directional MoCA filter 100 is a point-of-entry ("POE") filter installed, for example, at an input of a CATV entry adapter between the premises 103 (e.g., a home or business of a CATV subscriber) and a cable (e.g., COAX cable) connecting the headend 107 (e.g., a provider of high-definition multimedia content and broadband Internet service). In accordance with aspects of the present disclosure, the directional MoCA filter 100 includes a first port 111 (e.g., a lowband port) and a second port 115 (e.g., a highband port), which are connected in parallel by signal path 120 and signal path 125. In embodiments, the first port 111 receives a downstream signal 119 from the headend 107, and the second port 115 receives an upstream signal 121 and a MoCA signal 123 from the premises 103. In accordance with aspects of the present disclosure, the downstream signal 119 can have a frequency range between 5 MHz and about 1675 MHz. In embodiments, the downstream signal 119 can have frequency range between about 5 MHz and about 1218 MHz. The upstream signal 121 can include a signal sent from the premises 103 to the headend 107 having a frequency range between about 5 MHz and 54 MHz. Additionally, the MoCA signal 123 from the premises 103 can a frequency range between about 1125 MHz and 1675 MHz.

In accordance with aspects of the present disclosure, the signal paths 120 and 125 are separate, parallel paths configured to pass and/or reject different frequency ranges. Bidirectional path 120 is a physical (e.g., wired) signal path between the first port 111 and the second port 115 including one or more low-pass filter devices 130 arranged in series and configured to pass signals below a predetermined frequency, while rejecting and/or terminating signals above the predetermined frequency. In embodiments, the predetermined frequency of the one or more low-pass filter devices 130 is about 1218 MHz. Additionally, in embodiments, the predetermined frequency of the one or more low-pass filter devices 130 is about 1194 MHz. Further, in embodiments, the predetermined frequency of the one or more low-pass filter devices 130 is about 1002 MHz. Thus, in accordance with aspects of the present disclosure, portions of the downstream signal 119 and the upstream signal 121 below the predetermined frequency of the one or more low-pass filter devices 130 can travel across path 120 between the first port 111 and the second port 115. Accordingly, the path 120 allows bidirectional communication between the premises 103 and the headend 107. For example, the premise device 103 and the headend 107 can exchange information related to CATV content via bidirectional path 120 using the downstream and upstream frequency bands.

In accordance with aspects of the present disclosure, unidirectional path 125 is a physical (e.g., wired) path between the first port 111 and the second port 115 including one or more band-pass filter devices 135 and an isolator 140 arranged in series. The one or more band-bass filter devices 135 carry signals within a predetermined frequency range and reject and/or terminate signals outside the predetermined frequency range. In embodiments, the predetermined frequency range of the one or more band-pass filter devices 135 is between about 1002 MHz and about 1218 MHz, which can, for example, correspond to the extended CATV band. The isolator 140 can be a directional passing block (e.g., gate) that prevents a MoCA signal 123 from passing from the second port 115 to the first port 111.

In accordance with aspects of the present disclosure, the directional MoCA filter 100 can prevent leakage of MoCA signals in the overlap of the MoCA band (e.g., 1125 MHz to 1675 MHz) and the expanded CATV band (e.g., 1125 MHz to 1218 MHz) from the premises 103 via unidirectional path 125, while extended CATV signals (e.g., 5 MHz to 1218 MHz) are communicated via the bidirectional path 120. In embodiments, the directional MoCA filter 100 communicates signals with a frequency lower than 1002 MHz bidirectionally via path 120; and, it can only communicate signals with a frequency between 1002 MHz and 1218 MHz unidirectionally from the first port 111 to the second port 115 via path 125.

Figure 2:
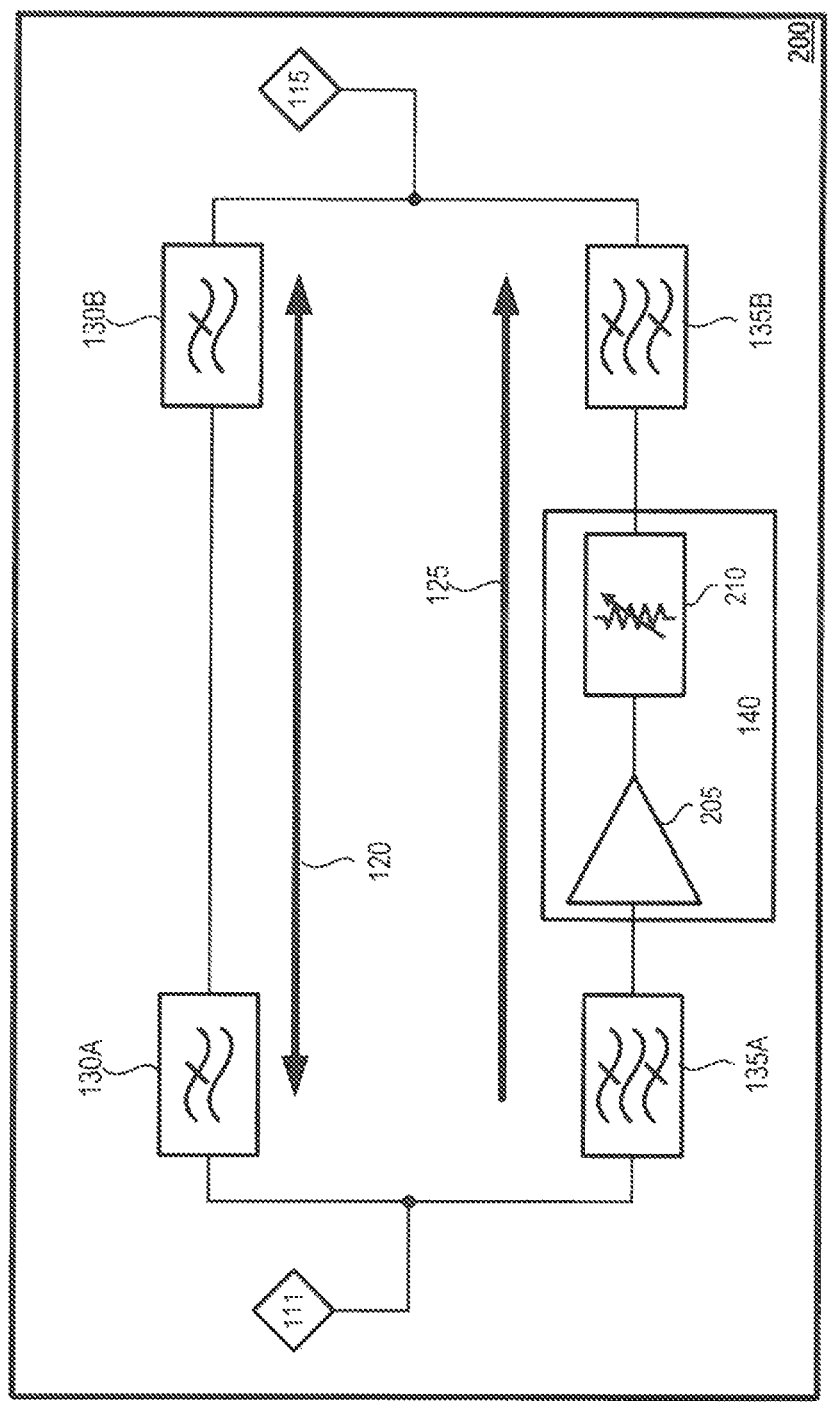
FIG. 2 shows an example of a MoCA filter in accordance with aspects of the present disclosure.

FIG. 2 shows an example of a directional MoCA filter 200 in accordance with aspects of the present disclosure. The directional MoCA filter 200 includes first port 111, second port 115, bidirectional path 120, and unidirectional path 125 having low-pass filter devices 130A, 130B, band-path filters 135A, 135B, and an isolator 140, which can be the same or similar to those previously described herein. Additionally, the low-pass filter devices 130A, 130B, the band-bass filters 135A, 135B, and the isolator 140 can pass and/or reject the predetermined frequencies previously described herein.

In embodiments, the unidirectional path 125 solely communicates an expanded downstream signal (e.g., 1002 MHz-1218 MHz) from the first port 111 (e.g., lowband port) to the second port 115 (e.g., highband port), which provides a directional MoCA filter. The bidirectional path 120 includes low-pass filter device 130A, which can be part of a lowband port diplexer connected to low-pass filter device 130B, which can be part of a highband port diplexer. The unidirectional path includes band-pass filter 135A, which can be part of the lowband diplexer, serially connected to the isolator 140 and band-pass filter device 135B, which can be part of the highband port diplexer.

In accordance with aspects of the present disclosure, the isolator 140 is an active device. In embodiments, the isolator 140 comprises an amplifier (e.g. a radio-frequency (RF) amp) 205 and an attenuator 210. The amplifier 205 is a substantially unidirectional device which passes the expanded portion of a downstream signal (e.g., downstream signal 119) received at the first port 111 and output by the band-pass filter device 135A. The attenuation of attenuator 210 can be set to the same as the gain of the amplifier 205 to provide a unity gain.

In accordance with aspects of the present disclosure, an input of the amplifier 205 receives the downstream signal and an output of the amplifier 205 receives and blocks a MoCA signal (e.g., MoCA signal 123). As will be understood by one of ordinary skill in the art, the amplifier 205 communicates the downstream signal to the second port 115 and prevents the MoCA signal from being communicated to the first port 111. Thus, via the amplifier 205, the path 125 unidirectionally communicates a portion of the downstream signal in path 125 in the predetermined band-pass frequency range of the band-pass filter devices 135A and 135B, while rejecting any MoCA signal from the second port 115 to the first port 111. At the same time, path 120 bidirectionally communicates the downstream signal and the upstream signal in the predetermined low-pass frequency range of the low-pass filter devices 130A and 130B.

Figure 3:
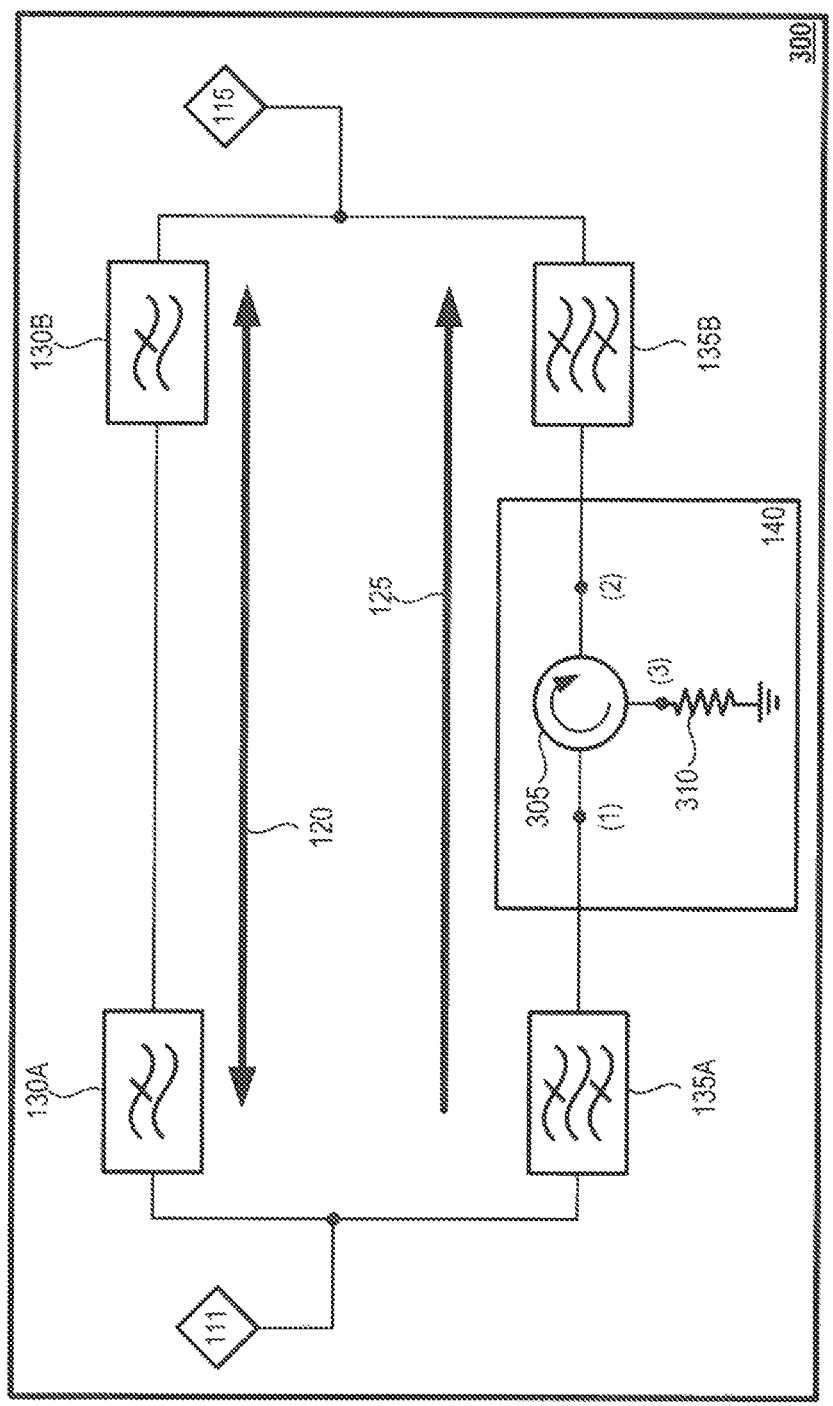
FIG. 3 shows an example of a MoCA filter in accordance with aspects of the present disclosure.

FIG. 3 shows an example of a directional MoCA filter 300 in accordance with aspects of the present disclosure. The directional MoCA filter 300 includes ports 111 and 115, paths 120 and 125 having low-pass filter devices 130A, 130B, band-pass filters 135A, 135B, and an isolator 140, which can be the same or similar those previously described herein. In embodiments, the isolator 140 is a passive circuit including a circulator 305 and a resistor 310 tied to ground potential. The circulator 305 is a non-reciprocal device having three nodes (1, 2, 3), in which a signal entering any node is only transmitted to the next node in rotational (e.g., clockwise) direction. More specifically, a signal applied to node (1) only passes out of node (2); a signal applied to node (2) only passes out of node (3).

In accordance with aspects of the present disclosure, the circulator 305 only passes a portion of a downstream signal (e.g., downstream signal 119) input to the first port 111 and output by band-pass filter device 135A from node (1) to node (2), such that the downstream signal is communicated to the second port 115. However, a MoCA signal (e.g., MoCA signal 123) from the second port 115 and output by band-pass filter device 135B only passes from node (2) to node (3). As such, the MoCA signal is directed to ground via resistor 310 and, thus, is blocked from communication to the first port 111. Accordingly, via the circulator 305 and the resistor 310, path 125 can communicate a portion of a signal from the first port 111 within the predetermined frequency range while preventing any signal from passing from the second port 115 to the first port 111 along path 125. Meanwhile, path 120 can bidirectionally communicate the downstream signal and the upstream signal in the predetermined low-pass frequency range of the low-pass filter devices 130A and 130B.

Figure 4:
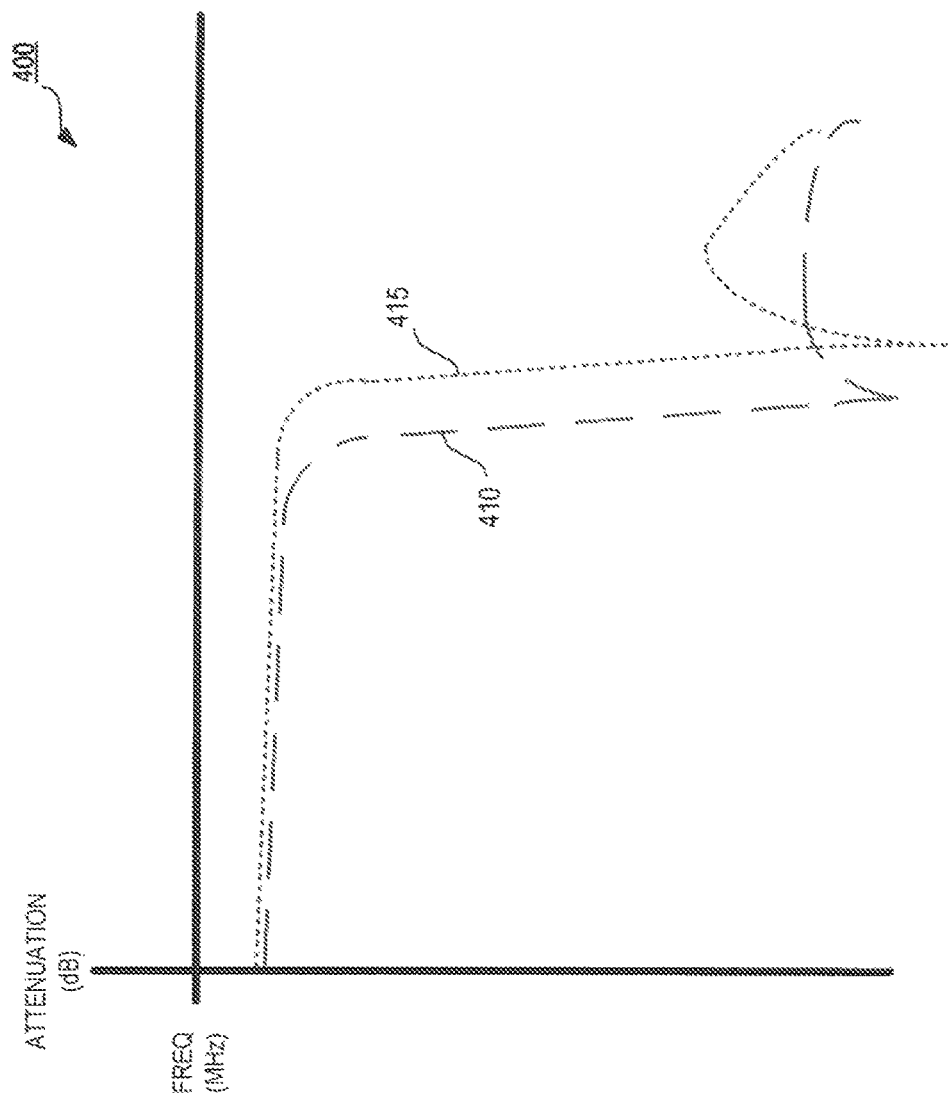
FIG. 4 shows a graph illustrating examples of signals of a MoCA filter in accordance with aspects of the present disclosure.

FIG. 4 shows a graph 400 illustrating examples of signals of a MoCA filter in accordance with aspects of the present disclosure. The graph 400 plots frequency versus attenuation values of input signals and output signals of any of the MoCA filters previously described herein. Line 410 represents the attenuation versus frequency response for an upstream signal (e.g., a signal traveling from the second port 115 to the first port 111) in accordance with aspects of the present disclosure. Line 415 represents attenuation versus frequency response for a downstream signal (e.g., a signal traveling the first port 111 to the second port 115) in accordance with aspects of the present disclosure. As previously described herein, a directional MoCA filter (e.g., directional MoCA filter 100) includes a bidirectional path (e.g., bidirectional path 120) and an unidirectional path (e.g., unidirectional path 125). Embodiments of the bidirectional path include one or more low-pass filter devices (e.g., low filter device 130) that only pass signals having a frequency lower than about—1002 MHz. Additionally, as previously described herein, embodiments of the unidirectional path include one or more band-pass filter devices (e.g., band-pass filter device 135). In accordance with aspects of the present disclosure, the one or more band-pass filter devices pass signals having a frequency between about 1002 MHz and about 1218 MHz.

The foregoing description, for purpose of explanation, has been described with reference to specific embodiments. However, the illustrative discussions above are not intended to be exhaustive or to limit the present disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the present disclosure and its practical applications, to thereby enable others skilled in the art to best utilize the present disclosure and various embodiments with various modifications as are suited to the particular use contemplated. Additional information supporting the disclosure is contained in the appendix attached hereto.

What is claimed is:

1. A Multimedia over Coaxial Alliance (MoCA) filter comprising:
   a first port;
   a second port;
   a unidirectional path between the first port and the second port, wherein the unidirectional path communicates at least a portion of a cable television (CATV) signal from the first port to the second port and prevents a MoCA signal from being communicated from the second port to the first port, and wherein the unidirectional path comprises:
      a first band-pass filter device;
      a second band-pass filter device; and
      an isolator positioned between the first and second band-pass filter devices; and
   a bidirectional path between the first port and the second port, wherein the bidirectional path communicates at least a portion of the CATV signal from the first port to the second port, wherein the unidirectional and bidirectional paths are in parallel, and wherein a frequency range of the CATV signal at least partially overlaps with a frequency range of the MoCA signal.

2. The MoCA filter of claim 1, wherein:
   the first port is an external port configured to receive the CATV signal provided to a premises; and
   the second port is an internal port configured to receive the MoCA signal from the premises.

3. The MoCA filter of claim 2, wherein:
   the bidirectional path communicates a portion of the CATV signal below a predetermined frequency from the first port to the second port.

4. The MoCA filter of claim 2, wherein:
   the unidirectional path communicates the CATV signal between a predetermined frequency range from the first port to the second port; and
   the unidirectional path rejects or terminates communication of the MoCA signal below the predetermined frequency from the second port to the first port.

5. The MoCA filter of claim 1, wherein the bidirectional path comprises one or more low-pass filter devices.

6. The MoCA filter of claim 1, wherein the isolator comprises an active device.

7. The MoCA filter of claim 6, wherein the active device comprises an amplifier.

8. The MoCA filter of claim 1, wherein the isolator comprises a passive device.

9. The MoCA filter of claim 8, wherein the passive device comprises a circulator.

10. A Multimedia over Coaxial Alliance (MoCA) filter comprising:
    a first port;
    a second port;
    a unidirectional path between the first port and the second port, wherein the unidirectional path communicates at least a portion of a cable television (CATV) signal from the first port to the second port and prevents a MoCA signal from being communicated from the second port to the first port; and
    a bidirectional path between the first port and the second port, wherein the bidirectional path communicates at least a portion of the CATV signal from the first port to the second port, wherein the unidirectional and bidirectional paths are in parallel, and wherein a frequency range of the CATV signal at least partially overlaps with a frequency range of the MoCA signal,
    wherein:
       the unidirectional path comprises:
          a first band-pass filter device;
          a second band-pass filter device;
          an isolator positioned between the first and second band-pass filter devices; and
          a three-node circulator;
       a first node of the circulator receives a portion of the CATV signal from the unidirectional path;
       a second node of the circulator receives the portion of the CATV signal from the first node;
       the second node of the circulator receives a portion of the MoCA signal from the unidirectional path;
       a third node of the circulator receives the portion of the MoCA signal from the second node; and
       the third node is tied to ground potential through a resistor.

11. The MoCA filter of claim 10, wherein the first node receives the CATV signal from a cable television provider.

12. The MoCA filter of claim 10, wherein the second node receives the MoCA signal from a premises.

13. The MoCA filter of claim 3, wherein the predetermined frequency is about 1194 MHz.

14. The MoCA filter of claim 3, wherein the predetermined frequency is about 1002 MHz.

15. The MoCA filter of claim 4, wherein the predetermined frequency range is from about 1002 MHz to about 1225 MHz.

16. The MoCA filter of claim 4, wherein the predetermined frequency range is from about 1002 MHz to about 1218 MHz.

17. A Multimedia over Coaxial Alliance (MoCA) filter comprising:
    a first port;
    a second port;
    a unidirectional path between the first port and the second port, wherein the unidirectional path communicates at least a portion of a cable television (CATV) signal from the first port to the second port and prevents a MoCA signal from being communicated from the second port to the first port; and
    a bidirectional path between the first port and the second port, wherein the bidirectional path communicates at least a portion of the CATV signal from the first port to the second port, wherein the unidirectional and bidirectional paths are in parallel, and wherein a frequency range of the CATV signal at least partially overlaps with a frequency range of the MoCA signal,
    wherein:
       the bidirectional path includes a first low-pass filter device serially connected to a second low-pass filter device;
       the unidirectional path includes a first band-pass filter device, a second band-pass filter device, and a passive isolator serially connected to and positioned between the first and second band-pass filter devices; the passive isolator device comprises a circulator; a first node of the circulator receives the CATV signal; a second node of the circulator isolates the MoCA signal from the first port; and a third node of the circulator is terminated.

18. A filter device comprising:
a first port electrically configured to receive a first signal provided to a premises and to split the first signal between a bidirectional path and a unidirectional path;
a second port electrically configured to receive a second signal from the premises and to split the second signal between the bidirectional path and the unidirectional path, and
wherein:
the bidirectional path and the unidirectional path are connected in parallel between the split of the first port and the split of the second port,
the unidirectional path comprises:
a first band-pass filter device;
a second band-pass filter device; and
an isolator between the first and second band-pass filter devices,
the isolator is configured to permit communication of the first signal from the split of the first port to the split of the second port, and to reject communication of the second signal from the split of the second port to the split of the first port; and
a frequency range of the first signal at least partially overlaps with a frequency range of the second signal.

19. The filter device of claim 18, wherein:
the bidirectional path communicates a portion of the first signal below a predetermined frequency from the first port to the second port.

20. The filter of claim 18, wherein the isolator comprises a passive device.

21. The filter of claim 18, wherein:
the first signal has a first bandwidth;
the second signal has a second bandwidth that overlaps with the first bandwidth and a third bandwidth higher than the first bandwidth;
the bidirectional path is configured to pass the second bandwidth and reject the third bandwidth; and
the unidirectional path is configured to pass a portion of the first bandwidth.

22. The filter of claim 21, wherein the bidirectional path is configured to reject the portion of the first bandwidth overlapping the third bandwidth.

23. The filter of claim 21, wherein:
the first bandwidth is less than or equal to about 1218 MHz; and
the third bandwidth is greater than or equal to about 1125 MHz.

24. A Multimedia over Coaxial Alliance (MoCA) filter comprising:
a first port;
a second port;
a unidirectional path between the first port and the second port, wherein the unidirectional path communicates at least a portion of a cable television (CATV) signal from the first port to the second port and prevents a MoCA signal from being communicated from the second port to the first port, wherein the unidirectional path comprises:
a first band-pass filter device;
a second band-pass filter device; and
an isolator positioned between the first and second band-pass filter devices; and
a bidirectional path between the first port and the second port, wherein the bidirectional path communicates at least a portion of the CATV signal from the first port to the second port, wherein the unidirectional and bidirectional paths are in parallel, wherein a frequency range of the CATV signal is from about 5 MHz to about 1218 MHz, and wherein a frequency range of the MoCA signal is from about 1125 MHz to about 1675 MHz.

25. The MoCA filter of claim 24, wherein the first band-pass filter device, the second band-pass filter device, or both are configured to communicate at least a portion of the CATV signal between 1002 MHz and 1218 MHz from the first port to the second port.

26. The MoCA filter of claim 25, wherein the bidirectional path comprises a low-pass filter device configured to communicate at least a portion of the CATV signal less than about 1002 MHz from the first port to the second port and at least a portion of the MoCA signal less than about 1002 MHz from the second port to the first port.

* * * * *